United States Patent Office 3,667,790
Patented June 6, 1972

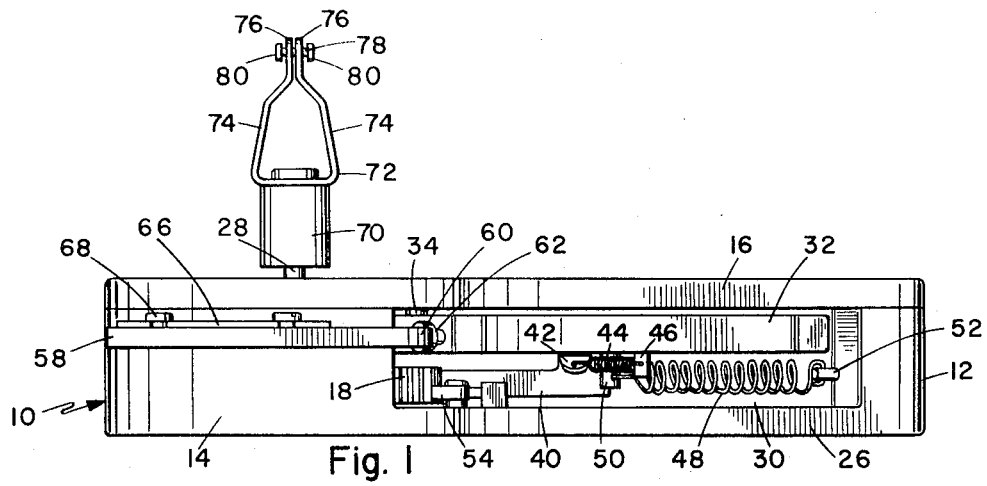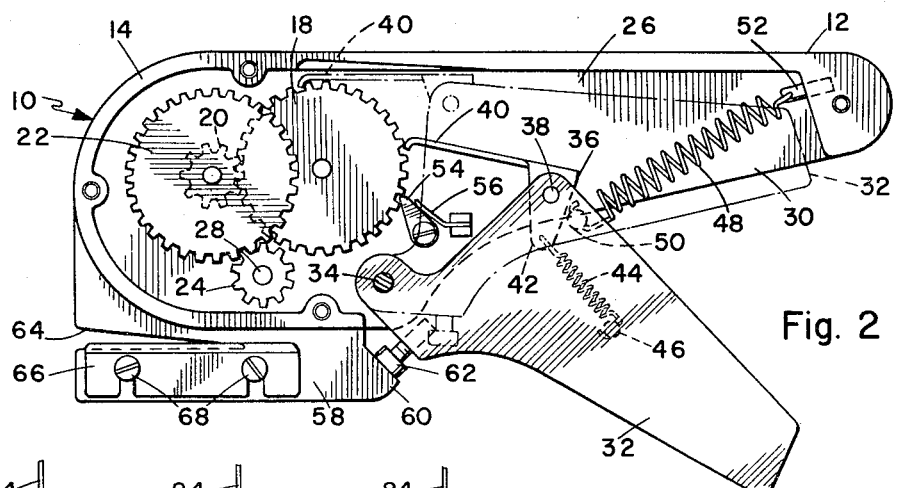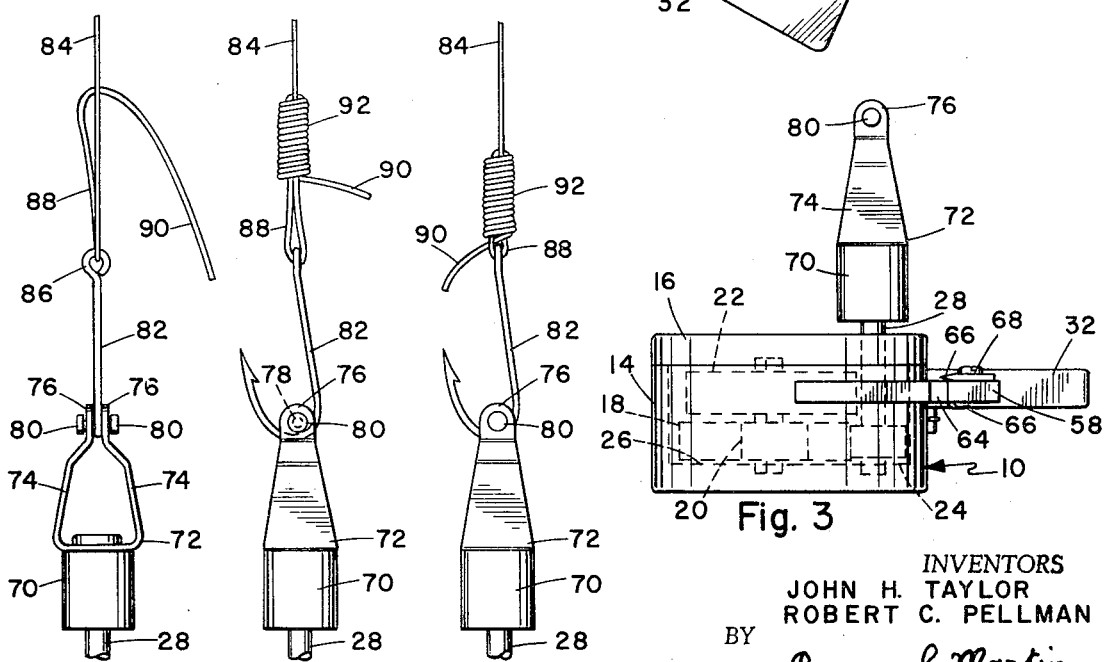

3,667,790
KNOT WINDER FOR TYING FISH HOOKS
John H. Taylor, 2033 Wilbur St. 92109, and Robert C. Pellman, 4505 Quantico 92117, both of San Diego, Calif.
Filed Jan. 25, 1971, Ser. No. 109,227
Int. Cl. B65h 69/04
U.S. Cl. 289—17                      8 Claims

ABSTRACT OF THE DISCLOSURE

A hand held knot winding tool in which a fish hook is secured in a holder and spun rapidly by a squeeze action drive mechanism, to wind a knot around a leader attached to the hook. Only one hand is necessary to operate the tool, leaving the other hand free to guide and complete the knot.

BACKGROUND OF THE INVENTION

A common type of secure knot used in tying a leader to a fish hook involves winding the end of the leader around a loop formed through the eye of the hook and securing the end through the loop, which is pulled tight. Many different devices have been developed for holding a fish hook while tying on a leader or lure, usually with some type of vise or jaw clamp secured to a suitable support, so that both hands are free to form the knot. Such apparatus is not always available, or may not be practical to set up, particularly at a fishing location, and the local conditions, often cold and wet, may make knot tying a difficult process.

SUMMARY OF THE INVENTION

The knot winding tool described herein is a compact hand held unit which is operable by one hand. A fish hook is held in a spring clevis and can be inserted and removed quickly without clamping means. The clevis is spun by a squeeze action operated high speed drive mechanism, one squeeze normally being sufficient to wind the knot. The other hand is free to hold the leader loop and guide the winding, then secure and lock the knot. A knife incorporated in the tool facilities cutting off the end of the leader.

The primary object of this invention, therefore, is to provide a new and improved knot winding tool.

Another object of this invention is to provide a new and improved knot winding tool which is operable by one hand and does not require supporting means.

A further object of this invention is to provide a new and improved knot winding tool in which a fish hook is easily inserted and removed without clamping means.

Other objects and many advantages of this invention will become more apparent upon a reading of the following detailed description and an examination of the drawing, wherein like reference numerals designate like parts, throughout and in which:

FIG. 1 is a side elevation view of the tool.

FIG. 2 is a top plan view with the top cover plate removed.

FIG. 3 is an end elevation view as taken from the left hand end of FIG. 1.

FIG. 4 is a side elevation view of the hook holding clevis, showing the starting position of a knot.

FIG. 5 shows the knot winding completed.

FIG. 6 shows the knot secured and tightened.

DESCRIPTION OF THE PREFERRED EMBODIMENT

The tool comprises a casing 10 having an extended handle portion 12, the casing being hollow with a peripheral wall 14, and closed by a top plate 16 secured by suitable screws or the like. In the casing 10 is a high speed gear drive including a large ratchet gear 18 driving a small transfer gear 20, which is fixed to a large drive gear 22 driving a small output gear 24. The gears are journalled between the base plate 26 and top plate 16 of the casing, the output gear having a shaft 28 which projects above the top plate.

Along one side of handle portion 12 the side wall is cut away to provide a large open slot 30. Mounted on the underside of top plate 16 is a handle 32 hinged on a pivot pin 34 adjacent the gear means to swing into and out of the slot 30. Attached to handle 32 is an arm 36 pivotally mounted on a pin 38, the arm carrying a drive pawl 40 which extends to engage the teeth of ratchet gear 18. Arm 36 has a lug 42 from which a spring 44 extends to a fixed pin 46 on the handle, to hold the drive pawl in contact with the ratchet gear. When handle 32 is squeezed into the handle portion 12, as in the broken line position in FIG. 2, pawl 40 rotates the ratchet gear 18 for part of a revolution and, through the gear drive, causes shaft 28 to spin through a number of revolutions. Handle 32 is returned to the open position by a return spring 48, stretched between a pin 50 on the handle and a pin 52 fixed in the outer end of handle portion 12. Rotation of the ratchet gear 18 is limited to the driving direction by a non-return pawl 54 pivotally mounted on base plate 26 and biased against the ratchet gear by a spring 56.

Casing 10 has a platform 58 projecting from wall 14 on the same side as and generally in the plane of handle 32. Adjacent the slot 30, the platform has a stop portion 60, handle 32 having an adjustable stop screw 62 which strikes the stop portion to limit the outward travel of the handle. Platform 58 has a tapered longitudinal slot 64, having its wide end open at the end opposite the handle portion. On top of the platform is a cutting blade 66 adjustably held by screws 68, the blade extending over the slot 64 to provide a slice action cutter for a line or leader.

Mounted on shaft 28 is a collar 70 which is secured in any suitable manner, such as a lock screw or the like. Fixed to the top of collar 70 is a clevis 72 having upwardly extending resilient arms 74, which converge at the upper end and have confronting parallel tongues 76. The tongues are biased togethed by the resilience of arms 74, and are connected by a retaining pin 78 having enlarged heads 80 on opposite ends, which are spaced to allow limited separation of the tongues.

As shown in FIGS. 4 through 6, a fish hook 82 is inserted between tongues 76 and pulled up against retaining pin 78, the hook being held by the resilient grip of the clevis. A leader 84 is threaded through the eye 86 of the hook and folded back in a loop 88, the end 90 being turned across the leader, as in FIG. 4. The looped leader is held in this position between the thumb and forefinger of one hand, the other hand holding the tool. Since the leader is held in this fashion, substantially in tension, there is no need for special positive clamping means for the hook.

When the handle 32 is squeezed, the clevis 72 is spun by shaft 28. With the looped and crossed over leader held ligthly between the finger and thumb, the rotation will cause the leader end to be wrapped around the leader. With very little practice, a neatly wound knot 92 can be formed, as in FIG. 5. The end 90 is then passed through the loop 88 below the knot and the leader 84 is pulled tight to close the loop and lock the end in place, as in FIG 6. Hook 82 is then removed from the clevis and the leader end is trimmed off on blade 66.

The tool is compact enough to fit easily in a tackle box or a pocket, and is ready for immediate use without any setting up. With no clamps to tighten or loosen, the operation is very simple and a secure knot can be made in a few seconds.

Having described our invention, we claim:

1. A knot winder for tying fish hooks, comprising:
   a casing having a shaft rotatably mounted therein;
   manually operable drive means in said casing, connected to said shaft and being adapted to rotate the shaft several turns at one operation;
   and a clevis mounted on said shaft, said clevis having resilient arms with closely confronting fish hook gripping tongues thereon.

2. A knot winder according to claim 1, and including a retaining pin extending through and between said tongues, said pin having enlarged ends spaced to limit the separation of the tongues.

3. A knot winder according to claim 1, wherein said drive means includes a squeeze actuated handle pivotally mounted in said casing, and speed increasing gear means actuated by said handle and couple to said shaft.

4. A knot winder according to claim 3, and including ratchet means associated with said gear means, limiting the driven rotation of said shaft to one direction.

5. A knot winder according to claim 4, wherein said resilient arms converge toward said tongues and the tongues are substantially parallel, the clevis having a retaining pin extending between said tongues, with means to limit the separation of the tongues.

6. A knot winder according to claim 1, wherein said casing has an extended handle portion with an open slot therein, said drive means including a handle pivotally mounted in said casing to swing into and out of said slot, and speed increasing gear means coupled between said handle and said shaft.

7. A knot winder according to claim 6, and including a platform on the side of said casing adjacent said handle, said platform having an open ended slot therein, and a cutting blade secured across said slot.

8. A knot winder according to claim 7, wherein said platform is substantially in the plane of said handle and has a stop portion thereon limiting the outward motion of the handle.

References Cited

UNITED STATES PATENTS

| | | | |
|---|---|---|---|
| 2,865,665 | 12/1958 | Messa | 289—17 |
| 3,520,566 | 7/1970 | Bovigny | 289—17 |

LOUIS K. RIMRODT, Primary Examiner